April 4, 1944.  F. O. ROBERTS  2,345,631
METHOD OF UNITING CABLE SECTIONS
Filed Jan. 13, 1942
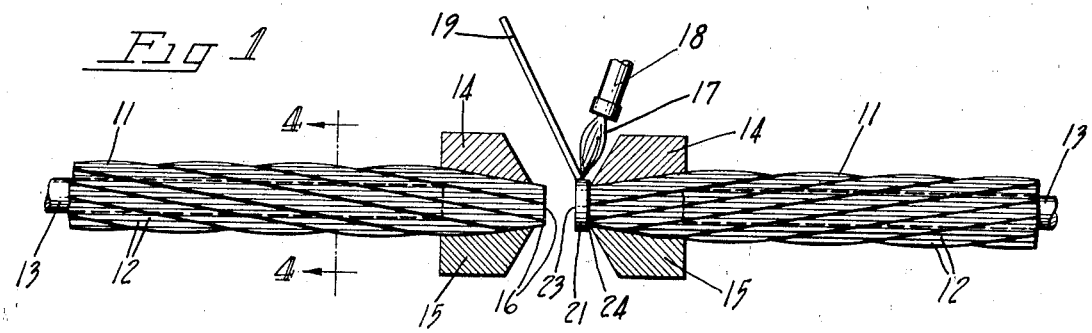
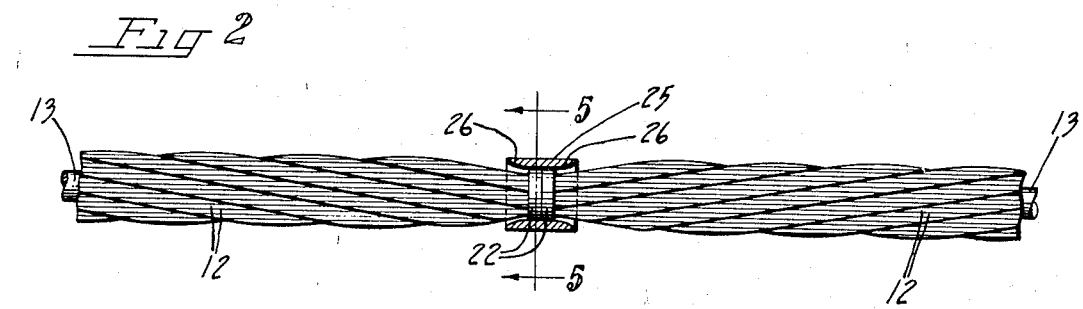
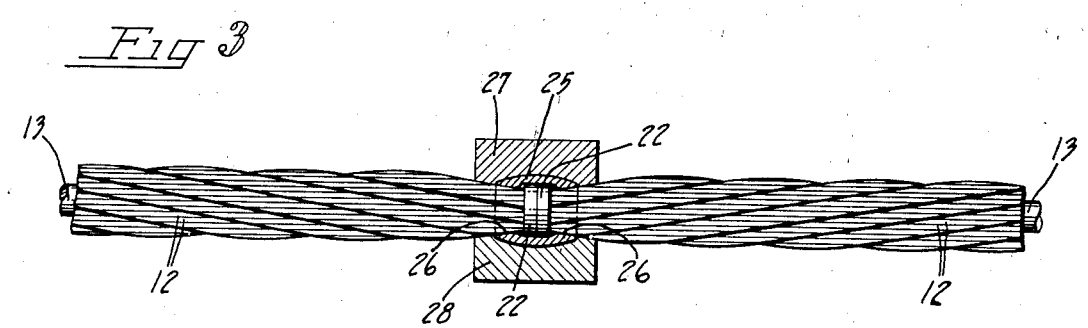
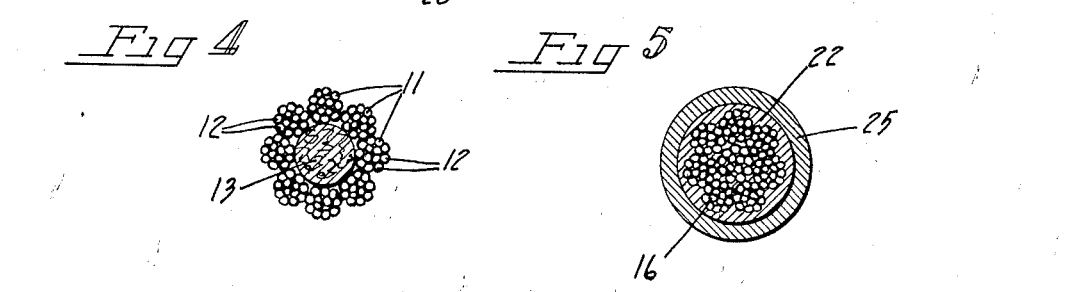
INVENTOR.
Fred Owen Roberts
BY Ivan D. Thornburgh
Charles H. Erne
ATTORNEYS Patented Apr. 4, 1944

2,345,631

UNITED STATES PATENT OFFICE 2,345,631

METHOD OF UNITING CABLE SECTIONS

Fred Owen Roberts, Milwaukie, Oreg., assignor to American Can Company, New York, N. Y., a corporation of New Jersey Application January 13, 1942, Serial No. 426,636

5 Claims. (Cl. 29—148)

This invention relates to a method of preparing the ends of stranded wire cables as an incident to coupling such ends together and has particular reference to a method of uniting all of the wire strands, at each end, by brazing them into a solid section having an enlarged end portion and thereafter joining such enlarged portions together by encasing them within a collapsible sleeve of uniform cable diameter.

An object of the invention is the provision of a method of preparing the ends of stranded wire cables, in a cable connector, by joining together all of the wire strands into a single, solid and bulged portion at each end which is to form the joint, the prepared ends being coupled together by a tubular sleeve which is compressed around the bulged end portions to constitute a tight and firm connection.

Another object of the invention is the provision of a method of joining the ends of the stranded wires of a cable, which surround a core, by first removing a short piece of the core of each cable section, then squeezing the various strands together in the region of the removed core, brazing the strands together in a solid end part at each reduced end section and reshaping into an enlarged end collar, thereupon fitting the collared ends into a tubular sleeve and finally compressing the sleeve around the collars so that the joint will have a uniform cable diameter.

A further object of the invention is the provision of a method for producing a cable connector of the character described wherein the coupling sleeve with a length substantially equal to its exterior diameter, has its interior surfaces rounded so that when the sleeve is compressed over the preformed cable end sections, it tightly engages the enlarged collar portions to grip the cable ends together while the rounded edges of the sleeve merely loosely engage the adjacent cable strands thus avoiding the possibility of sharp edges cutting into the wire strands of the cable.

Numerous other objects and advantages of the invention will be apparent as it is better understood from the following description, which, taken in connection with the accompanying drawing, discloses a preferred embodiment thereof.

Referring to the drawing:

Figure 1 is a fragmentary longitudinal view of end portions of a stranded wire cable showing the ends being prepared prior to joining them together as one step in the present invention;

Fig. 2 is a view of the stranded wire cable of Fig. 1, with the solid collar end portions abutted together after being positioned within a tubular connector or sleeve;

Fig. 3 illustrates the further step of joining the cable end parts together by means of the sleeve which is compressed around the enlarged collar portions by means of suitable dies;

Fig. 4 is an enlarged section as viewed substantially along the line 4—4 in Fig. 1, illustrating the wire strands surrounding a hemp core; and Fig. 5 is an enlarged sectional view taken substantially along the line 5—5 in Fig. 2, showing the stranded wires united together in the brazed rim collar portion and showing the surrounding sleeve.

In the present invention stranded wire cables are secured together at their ends in solid end sections subsequently to being joined or linked together, as for example, in can conveyor systems and the like where long continuous cables are employed. In such systems the cables are run over sheaves and the solid metal connector must be made of uniform cable diameter. The connections should also be as short as practicable so that the connector or coupling will follow the curve of the sheave without undue bending or straining that might otherwise affect the endurance and long life of the installation. Obviously the same connector can be used to join intermediate sections of a multiple piece cable.

This method is especially applicable to cables that are of the wire strand and hemp core variety. In such cables the center or hemp core is cut back or removed for a short space from the end so that all of the outer wire strands of the cable end may be squeezed and collapsed into a reduced section. In a further step of this method, each strand of wire at the reduced sections is brazed to the adjoining strands of wire and by use of the brazing metal the stranded ends are built up into a solid enlarged collar end portion.

The enlarged collar end portion provides a narrow annular rim with a shoulder as illustrated in Fig. 1. The two shouldered cable ends are now ready to be secured together and this is done by a coupling sleeve or collapsible connector which is compressed on the enlarged collar portions in a tight and firm connection (Fig. 3).

In the disclosed embodiment of the instant invention, Figs. 1 and 4 of the drawing show wire groups 11 of a cable formed by individual wire strands 12. Such a stranded wire cable has a hemp center core 13 (Fig. 4). The first step in the present method is the cutting away of a short piece of the core 13 in the end of the cable which is to enter the joint.

The ends of the wire where the core is removed next are squeezed together by die parts 14, 15 (Fig. 1). This reduces the outer diameter of the wire strands providing a solid end section 16. The dies 14, 15 preferably are tapered to form a gradual reduction in the end of the cable.

The clamped end 16 of the cable next is subjected to a brazing action. This step is illustrated at the right in Fig. 1. For the brazing operation a flame 17 is directed against the wire ends from a burner or torch 18. When the wire has been heated sufficiently a rod 19 of brazing material is applied to ends of the stranded wires 12. This brazing operation unites all of the ends of the wire strands 12 into a solid end section.

The brazed wire ends then are built up by the brazing material until a slightly enlarged portion 21 of solid metal is formed at the end of the cable. All of the adjoining wires in this portion 21 are joined together in a solid mass which is enclosed completely in the enlarged portion.

The next step in the method has to do with reshaping the portion 21 into an annular rim or collar 22 having a flat transverse face 23. This may be done by filing or otherwise cutting away the irregular excess metal to produce the desired surface. A sharp shoulder 24 is formed at the back of the collar 22 to provide for better anchorage of the cable ends when they are joined together in the finished connection.

The prepared cable sections are ready for joining and the transverse surfaces 23 of the two sections are brought together while being inserted in a coupling sleeve 25 to provide the assembly shown in Fig. 2. This sleeve has an inside diameter at the center which closely fits the outside diameter of the two abutted collars 22. The interior surface of the sleeve tapers or flares toward the sleeve ends merging into rounded edges 26.

The final step in the present method is the reshaping of the sleeve member to effect the joint. This is illustrated in Fig. 3 by upper and lower die parts 27, 28 which are operated by suitable pressing devices, and which for the purpose of this method need not be shown. The die parts compress the coupling sleeve at the center to surround the abutted collars in tight, gripping engagement. The flared portions of the sleeve, including the rounded edges, are collapsed during this compressing step over the shoulders 24 at opposite ends to overlap and engage the shoulders in a tight and firm connection.

The rounded edges 26 are collapsed sufficiently to engage the stranded wires 12 lightly at the opposite ends. Due to the smooth surfaces of the sleeve sharp corners are eliminated thus preventing any danger of severing the wires as the cable is being operated over sheaves. The exterior diameter of the cable sleeve following the compressing step is substantially the same as the normal cable diameter and this insures free passage of the cable when operated in a grooved sheave.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of uniting cable sections each made up of wire strands, which comprises binding the ends of the strands of each cable section by brazing them together so that the brazed portion of each cable section is enlarged to a diameter less than that of the cable sections, and constricting the wall of a sleeve over and around both of said enlarged portions thereby coupling together the separate cable sections having a diameter substantially equal to the diameter of the cable sections.

2. A method of uniting cable sections each made up of wire strands surrounding a core, which comprises cutting back a part of the core at the end of each cable section, closely binding the ends of the strands of each cable section by brazing them together so that the brazed portion of each cable section is enlarged to transverse dimensions less than the maximum diameter of said cable, and constricting the walls of a sleeve over and around said enlarged ends thereby coupling together the separate cable sections, said coupling having a diameter substantially equal to that of the cable sections.

3. A method of uniting the ends of a cable made up of wire strands, which comprises joining the strands at each end of the section by brazing them together, forming collars on the brazed ends of the cable sections of less diameter than the diameter of said sections, assembling the cable sections by abutting said collars inside of a sleeve having an outside diameter substantially equal to the maximum transverse cable dimension and having rounded interior edges, and collapsing the wall of said sleeve into tight engagement on opposite extremities of said abutting collars to anchor the ends of the cable while substantially maintaining the aforesaid sleeve diameter, the said rounded sleeve edges lightly pressing against the wire strands.

4. A method of uniting cable sections each made up of wire strands surrounding a core, which comprises cutting back a part of the core at the end of each cable section, squeezing the ends of the strands together in the region of the removed core to reduce the diameter of the same, binding the ends of the reduced strands of each cable section by brazing them together while building up an enlarged end on the section of less diameter than the diameter of said section, and collapsing the wall of a sleeve over and around the enlarged ends of two adjacent cable sections to provide a coupling therefor having an external diameter substantially equal to the diameter of the cable sections.

5. The method of coupling the ends of cables which comprises the steps of reducing the diameter of the cable ends to be joined, forming an enlargement at each end smaller in diameter than that of the maximum cable diameter, abutting said enlarged ends within a tubular sleeve having an outside diameter and length substantially equal to the maximum diameter of the cable and deforming said tube by collapsing its walls into tight gripping engagement with the abutted enlargements at the cable ends while substantially maintaining the aforesaid sleeve diameter.

FRED OWEN ROBERTS.